United States Patent
McKee et al.

(10) Patent No.: US 7,509,290 B1
(45) Date of Patent: Mar. 24, 2009

(54) METHODS AND APPARATUSES FOR DIFFERENTIATING USERS IN MULTI-PLAYER WEB-BASED ENTERTAINMENT ENVIRONMENTS

(75) Inventors: Timothy P. McKee, Seattle, WA (US); Arlie L. Davis, Seattle, WA (US); Dean M. Pachosa, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1471 days.

(21) Appl. No.: 10/125,281

(22) Filed: Apr. 16, 2002

(51) Int. Cl.
*H04K 1/00* (2006.01)
*H04L 9/00* (2006.01)

(52) U.S. Cl. .............. 705/56; 705/50; 705/51; 705/55

(58) Field of Classification Search .......... 713/201, 713/202, 153, 168; 705/1, 50, 51, 75; 726/2, 726/27, 28
See application file for complete search history.

(56) References Cited

U.S. PATENT DOCUMENTS

| | | | | |
|---|---|---|---|---|
| 5,875,296 A * | 2/1999 | Shi et al. | ................... | 713/202 |
| 6,047,268 A * | 4/2000 | Bartoli et al. | ................ | 713/153 |
| 6,226,752 B1 * | 5/2001 | Gupta et al. | ................ | 713/201 |
| 6,275,934 B1 * | 8/2001 | Novicov et al. | ............. | 713/168 |
| 6,389,541 B1 * | 5/2002 | Patterson | .................... | 713/201 |
| 6,421,768 B1 * | 7/2002 | Purpura | ....................... | 713/202 |
| 6,763,468 B2 * | 7/2004 | Gupta et al. | ................ | 713/201 |

* cited by examiner

*Primary Examiner*—Andrew J. Fischer
*Assistant Examiner*—Joshua Murdough
(74) *Attorney, Agent, or Firm*—Lee & Hayes, PLLC

(57) ABSTRACT

A server device is connected to at least one client device over at least one network. The server device hosts a website having entry controller logic that accesses a cookie on a client device that is seeking access to the hosted website. The entry controller logic is configured to: (1) initiate authenticating logic if there is a registered user cookie; (2) grant the client device entry to the hosted website if there is no cookie and provide the client device with a new guest user cookie; (3) grant the client device entry to the hosted website if there is a valid guest user cookie; or, (4) initiate validating logic if the guest user cookie is invalid for some reason.

16 Claims, 3 Drawing Sheets

METHODS AND APPARATUSES FOR DIFFERENTIATING USERS IN MULTI-PLAYER WEB-BASED ENTERTAINMENT ENVIRONMENTS

TECHNICAL FIELD

This invention relates generally to client-server websites, and more particularly to methods and apparatuses for differentiating between registered and unregistered users during website sign-in.

BACKGROUND

A basic "no frills" website provides the viewing public with a certain amount of mostly static information in the form of one or more web pages that can be located, downloaded and viewed on a computer display using a web browser application. Such websites typically do not require any specific information about the client device computers and/or the users that access the web pages. This is one extreme. The other extreme are the websites that demand knowledge about the client devices and more particularly about the users.

Increasingly, these types of websites are becoming more complex and important computing resources for businesses and organizations around the world. As with other computing resources, there is a need to control user access, not only to protect the integrity of the website itself, but to also properly serve the users by controlling the type of information and processes exposed and/or the presentation of such information and features. Thus, for example, it is important for an online banking website to authenticate its users and present each user with information about their respective bank account(s) and specific features that may be available for their use.

There are also certain websites that fall in between these two extremes. For example, there may be times when certain users need to be known while other users may remain unknown to a website. One example is an entertainment website that allows users to actively participate in online games that are played alone or with other online users. Such websites tend to have some users that are registered users and other users that essentially signed-in as guest users (e.g., unknown/unregistered users). Guest users/accounts can be beneficial in that they allow new users to browse the website and try the services/games to get a taste for the experience without having to go through the extra steps of officially registering with the website.

Many entertainment websites are sponsor driven and thus it is important for them to attract and retain users that advertisers want to reach. Thus, it is important for these websites and others like them to provide easy to use interfaces such that new and existing users will continue to have good, if not excellent, experiences at the website.

Consequently, there is a continuing need for new and improved methods and apparatuses that can make the user sign-up/entry experience easier, faster and/or more pleasant for the users, and in particular new visiting users.

SUMMARY

Methods and apparatuses are provided that improve the user sign-up/entry experience for registered users, new visiting users and/or returning guest users.

By way of example, a method is provided that includes causing an entry controller portion of a server-hosted website to initiate an authenticating process if a client device seeking entry to said website has discoverable registered user information. If the client device does not have said registered user information but does have discoverable guest user information that is valid, then the method includes causing the entry controller portion to grant the client device entry to the website. If the client device does not have the registered user information but does have guest user information that is invalid, then the method includes causing the entry controller portion to initiate a validating process, wherein, for example, the user of the client device may decide to become a registered user. If the client device does not have registered user information or guest user information, then the method includes causing the entry controller portion to provide valid guest user information to the client device and grant the client device entry to the website. In certain preferred implementations, the registered user information includes a registered user cookie and the guest user information includes a guest user cookie.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
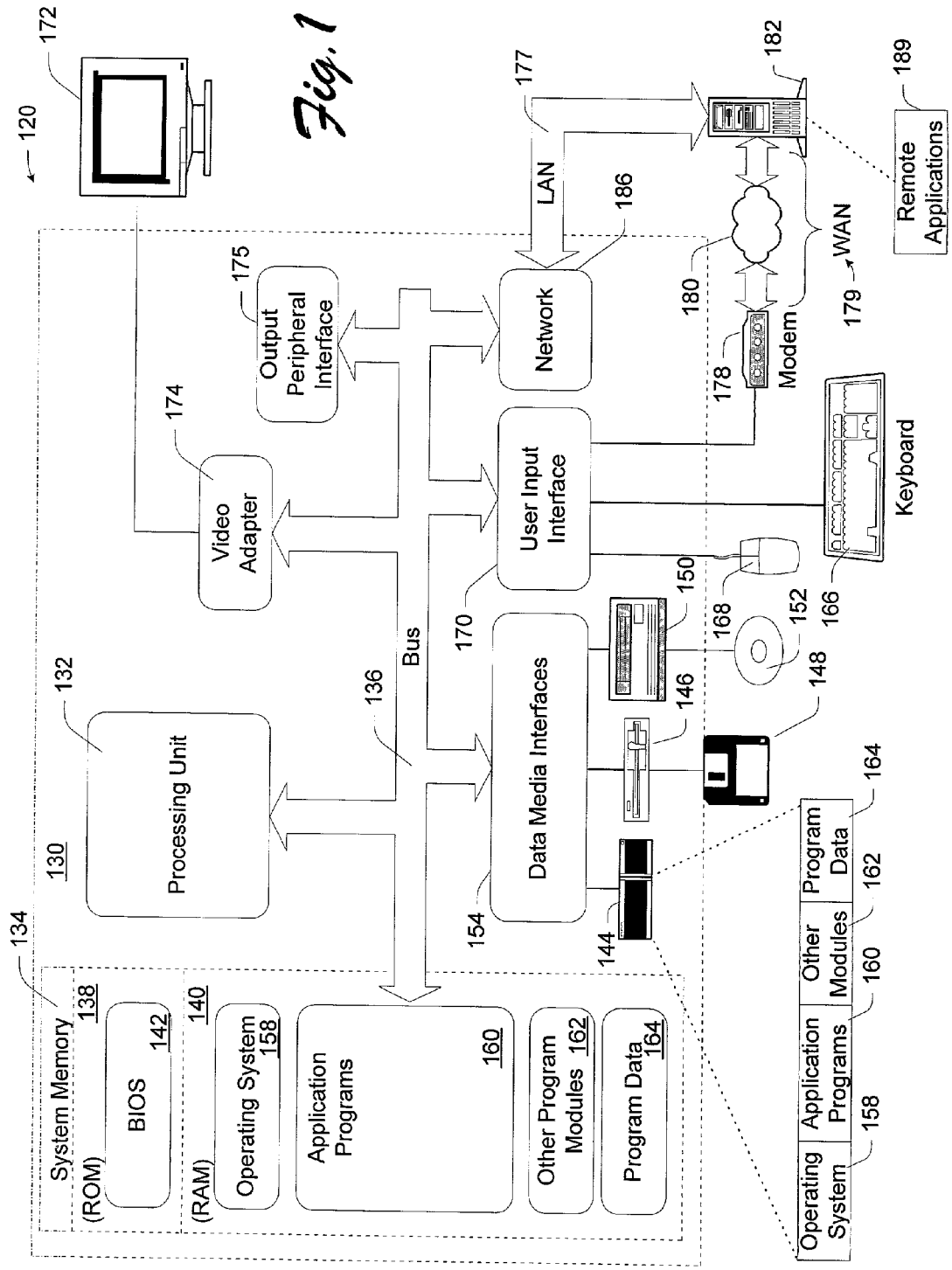
FIG. 1 is a block diagram generally illustrating an exemplary computer system suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and systems may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN a networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
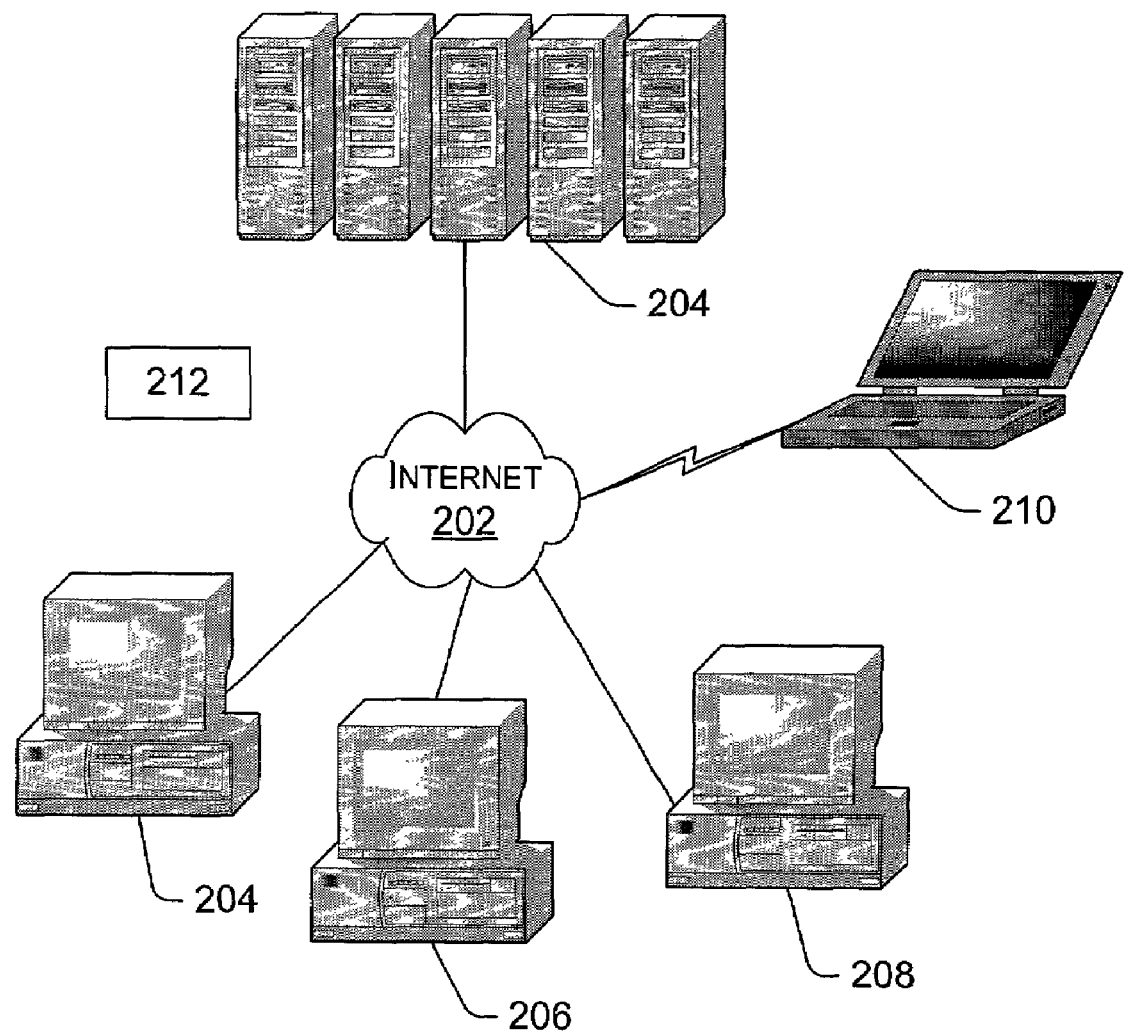
FIG. 2 is an illustrative diagram depicting a conventional client-server environment suitable for providing websites and corresponding web surfing user experiences.

Reference is now to FIG. 2, which illustrates a client-server environment 200 based, in this example, on the Internet 202. Of particular interest in this illustrative diagram is the World Wide Web portion of the Internet 200 and the common practice of having web servers 204 that are configured to provide web pages and other related capabilities to various client devices, such as, e.g., computers 204, 206, 208 and 210, that are configured to browse websites and interact with them over the internet.

To improve the user experience and/or provide for certain advanced features, it is becoming more and more common for websites to store cookies (data files) on the client devices. Thus, when a client revisits a website at a later time, the website server can discover the cookie 212 on the client device and thereby provide certain advanced capabilities like automatically recognizing the client device (user), establishing a specific web page/environment, and possible providing targeted information/advertising to the user based on previous visits and activities.

As described in the Background section, there are certain websites that have registered users/accounts and unregistered user/accounts for "guests". One example of an online game/entertainment website is the Zone (www.zone.com) provided by Microsoft Corp. of Redmond, Wash. In the past, to join in a multi-player online game at the Zone, all potential users were presented with a sign-in user interface. Users that had previously registered would therefore sign-in (authenticate) using a name/password combination that is unique within the website. After selecting/entering the applicable sign-in information, the registered users would then be allowed to enter the game lobby.

In accordance with certain aspects of the present invention, after careful analysis of potential user habits, it was found that this sign-in step, while not overly time-consuming or terribly difficult to satisfy, presented a substantial barrier that drove many visitors away from the game and/or website. Hence, methods and apparatuses are provided herein that remove the registration barrier for visitors and/or other users seeking to access the website without requiring having to register.

Figure 3:
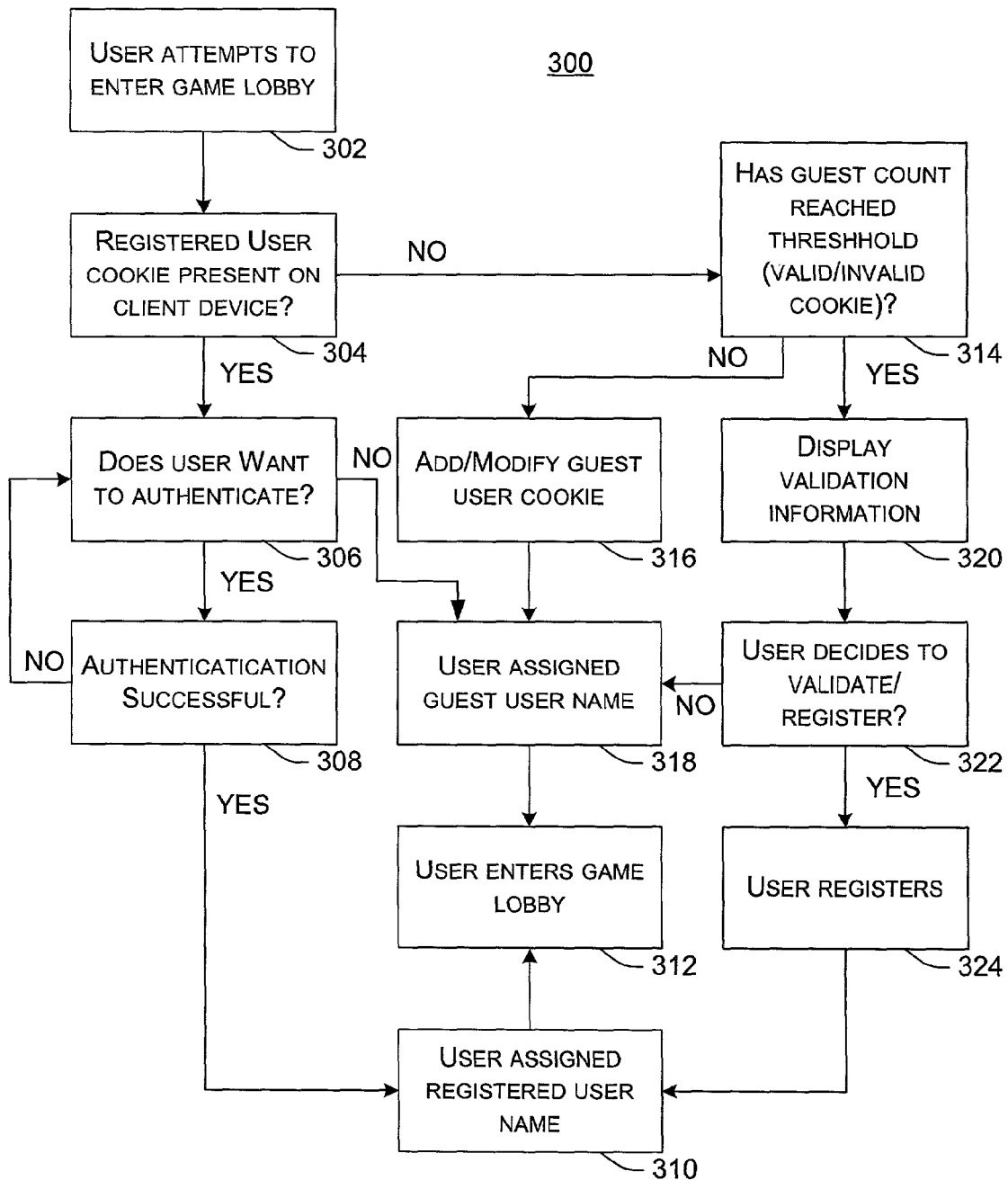
FIG. 3 is a flow diagram depicting a process for differentiating users in multi-player web-based entertainment environments, in accordance with certain exemplary implementations of the present invention.

With this in mind, attention is drawn to FIG. 3, which is a flow diagram depicting a process 300 for differentiating users in multi-player web-based entertainment environments, in accordance with certain exemplary implementations of the present invention. Clearly, those skilled in the art will recognize that this process is not restricted to entertainment websites, but may be implemented in a variety of websites wherein some users will have already registered and other users will be visiting and wanting to try at least a portion of the website's features.

As part of this invention, unique information is associated with each registered user's client device such that the information can be discovered when the registered user returns to the website. In certain preferred implementations, a registered user cookie is stored on the user's client device, and updated as needed during subsequent visits. Information is also associated with each guest user's client device such that the information can be discovered if/when the guest user returns to the website. In certain preferred implementations, a guest user cookie is stored on the user's client device and updated/modified as needed during subsequent visits. New users/client devices that have never been to the website will obviously not have relevant discoverable information available.

When a registered user returns to the website he/she will be presented with an appropriate registered user sign-in interface. In certain implementations, this step may be bypassed if, for example, the registered user has already been authenticated by an operatively associated and trusted resource, such as, Passport services.

When a guest user returns, he/she will most likely be automatically signed-in as a guest once again without requiring any user input or even presenting a sign-in interface, depending on the use of, and status of, the discoverable information, e.g., in the guest user cookie. In certain implementations, for example, information in the guest user cookie is examined to determine if the guest user cookie is still "valid" or if it is "invalid". If the guest user cookie is deemed to be valid then the user will be automatically signed-in as a guest once again.

If the guest user cookie is deemed to be invalid, then the user may be presented with some form of "validation" or "re-validation" information. For example, a user that has been a guest a certain number of times may be presented with "up sell" information promoting the benefits of becoming a registered user. If the user dismisses this information, then the user is signed-in as a guest again and applicable information (e.g., one or more parameters) in the guest user cookie modified. In other implementations, special advertising may be directed to the guest user based on the information in the guest user cookie.

Indeed, the guest user cookie and website can be configured to track and/or make a variety of decisions based on the user's visits. By way of example, the guest user cookie may include parameters such as, an incrementable visit count parameter, a measured guest cookie lifetime parameter, a date parameter, a time parameter, a previous score parameter, a user's previous expenditure parameter, a user activity measurement parameter, a user feedback parameter, and a user age parameter, e.g., if the user has ever input age information, and other like parameters. In certain implementations, information can be recorded that includes how many quest tickets are issued and how many guest users convert to be registered users. Such information can, for example, be used to help define the "barrier to entry" that a typical forced registration process invokes on a user.

Returning to FIG. 3, in step 302 all of the users attempt to enter the game lobby. In step 304, if a registered user cookie is discovered on the client device then process 300 continues to step 306, wherein the user decides whether to sign-in (authenticate). If the user devices (YES) to sign-in, then process 300 continues to step 308 for authentication. If the authentication in step 306 was not successful, then per step 308, process 300 returns to step 306 and the user can decide whether to try to authenticate again. If the authentication in steps 306-308 was successful then process 300 continues with step 310, wherein the registered user is assigned their name. Next, in step 312, the registered user is allowed to enter the game lobby. Referring back to step 306, if the user decides (NO) to not sign-in as a registered user, then process 300 continues with step 318, wherein the user is assigned a guest user name. Then, in step 312, the guest user is allowed to enter the game lobby. Hence, in this exemplary process, a registered user may nevertheless selectively sign-in as a guest.

Going back to step 304, if the client device does not have a registered user cookie then process 300 proceeds to step 314. Here, in step 314, if a guest user cookie is present then one or more parameters may be checked to see if a threshold or other measured indicator has been triggered by this current visit (i.e., the guest user cookie is determined to be valid or invalid in this step). If the guest user cookie is deemed to be valid, or if the client device does not have a guest user cookie (or a registered user cookie), then process 300 continues with step 316. If there is a valid guest user cookie then one or more parameters may be modified and/or new information created in the guest user cookie. A new guest user cookie is created for client devices that do not have one. Next, in step 318 a guest user name is assigned to the user and in step 312 the user is allowed to enter the game lobby.

Returning to step 314, in this example, if the guest user cookie is deemed invalid based on the decision(s) made in step 314, then process 300 continues with step 320. In step 320, validation information, such as, up sell information or the like is provided to the user, for example, to entice the user to become a registered user. In step 322, if the user decides to become a registered user, then in step 324 the user completes the registration process. A registered user cookie can now be provided to the client device and the guest user cookie removed. Once the user has signed-up he/she is assigned a registered user name in step 310 and then the newly registered user enters the game lobby, per step 312.

If, in step 322, the user decides not to register, then process 300 proceeds to step 318, wherein the user is assigned a guest user name and allowed to enter the game lobby in step 312.

Although some preferred implementations of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A computer-readable medium having computer-executable instructions for performing acts comprising:
   causing an entry controller portion of a server-hosted website to initiate an authenticating process if a client device seeking entry to said website has discoverable registered user information;
   if said client device does not have said registered user information but does have discoverable guest user information that is valid, then causing said entry controller portion to grant said client device entry to said website;
   if said client device does not have said registered user information but does have said guest user information that is invalid, then causing said entry controller portion to initiate a validating process; and
   if said client device does not have said registered user information and does not have said guest user information, then causing said entry controller portion to provide valid guest user information to said client device and grant said client device entry to said website.

2. The computer-readable medium as recited in claim 1, wherein said registered user information includes a registered user cookie, and said guest user information includes a guest user cookie.

3. The computer-readable medium as recited in claim 1, wherein causing said entry controller portion to grant said client device entry to said website if said guest user information is valid further includes:
   causing at least one portion of said website to modify at least a portion of said guest user information.

4. The computer-readable medium as recited in claim 3, wherein causing at least one portion of said website to modify at least a portion of said guest user information further includes:
   causing said at least one portion of said website to change at least one guest user parameter within said guest user information.

5. The computer-readable medium as recited in claim 4, having computer-executable instructions for performing further acts comprising:
   causing said entry controller portion to determine if said guest user information is valid based on at least one guest user parameter within said guest user information.

6. The computer-readable medium as recited in claim 1, wherein said guest user information includes at least one guest user parameter that is selected from a group of guest user parameters comprising a visit count parameter, a lifetime parameter, a date parameter, a time parameter, a score parameter, an expenditure parameter, an activity parameter, a feedback parameter, and a user age parameter.

7. The computer-readable medium as recited in claim 1, wherein as part of said validating process, said entry controller portion causes said client device to display user selectable sign-up information.

8. The computer-readable medium as recited in claim 1, wherein said website provides a multi-player online entertainment environment.

9. An apparatus operatively configurable as a server device that can be connected to at least one client device over at least one network, the apparatus comprising:
   hosted website entry controller logic configurable to receive information from a client device seeking access to said hosted website, said entry controller logic being configured to:
   (1) initiate authenticating logic if said information includes registered user information;
   (2) grant said client device entry to said hosted website if said information does not include:
   (a) said registered user information, and
   (b) guest user information; and
   (3) grant said client device entry to said hosted website if said information includes said guest user information and said guest user information is valid; and
   (4) initiate validating logic if said information includes said guest user information and said guest user information is invalid.

10. The apparatus as recited in claim 9, wherein said registered user information is associated with a registered user cookie information, and said guest user information is associated with guest user cookie information.

11. The apparatus as recited in claim 9, wherein said entry controller logic is further configurable to modify at least a portion of said guest user information and provide said modified guest user information to said client device.

12. The apparatus as recited in claim 11, wherein said entry controller logic is further configurable to change at least one guest user parameter within said guest user information.

13. The apparatus as recited in claim 12, wherein said entry controller logic is further configurable to determine if said guest user information is valid based on at least one guest user parameter within said guest user information.

14. The apparatus as recited in claim 9, wherein said guest user information includes at least one guest user parameter that is selected from a group of guest user parameters comprising a visit count parameter, a lifetime parameter, a date parameter, a time parameter, a score parameter, an expenditure parameter, an activity parameter, a feedback parameter, and a user age parameter.

15. The apparatus as recited in claim 9, wherein said validating logic is configurable to cause said client device to display user selectable sign-up information.

16. The apparatus as recited in claim 9, wherein said website provides a multi-player online entertainment environment.

* * * * *